United States Patent [19]

Kurashima

[11] Patent Number: 5,122,665
[45] Date of Patent: Jun. 16, 1992

[54] POWER SUPPLY CIRCUIT BREAKER FOR RADIATION IMAGE INFORMATION RECORDING AND READING SYSTEM

[75] Inventor: Kazuyuki Kurashima, Kanagawa, Japan

[73] Assignee: Fuji Photo Film Co., Ltd., Kanagawa, Japan

[21] Appl. No.: 599,912

[22] Filed: Oct. 19, 1990

[30] Foreign Application Priority Data

Oct. 20, 1989 [JP] Japan .................. 1-274367

[51] Int. Cl.$^5$ .............................................. G02B 42/00
[52] U.S. Cl. .................................................. 250/327.2
[58] Field of Search ............... 250/327.2, 327.2 A, 250/327.2 B, 327.2 D, 327.2 E, 327.2 F, 327.2 H, 327.2 J, 327.2 K, 327.2 L

[56] References Cited

U.S. PATENT DOCUMENTS

| | | |
|---|---|---|
| 4,258,264 | 3/1981 | Kotera et al. . |
| 4,276,473 | 6/1981 | Kato et al. . |
| 4,315,318 | 2/1982 | Kato et al. . |
| 4,387,428 | 6/1983 | Ishida et al. . |
| 4,400,619 | 4/1983 | Kotera et al. . |
| 4,640,507 | 2/1987 | Ohgoda et al. . |
| 4,851,679 | 7/1989 | Tamura et al. . |

FOREIGN PATENT DOCUMENTS

| | | | |
|---|---|---|---|
| 56-11395 | 2/1981 | Japan . | |
| 56-12599 | 2/1981 | Japan . | |
| 61-95342 | 5/1986 | Japan | 250/327.2 |

*Primary Examiner*—Constantine Hannaher
*Assistant Examiner*—Edward J. Glick
*Attorney, Agent, or Firm*—Sughrue, Mion, Zinn, Macpeak & Seas

[57] ABSTRACT

A radiation image information recording and reading system includes a circulatory feed system for feeding a stimulable phosphor sheet, an image recording device for recording radiation image information in the stimulable phosphor sheet, an image reading device for reading the recorded radiation image information from the stimulable phosphor sheet, and a remaining image erasing device for discharging radiation energy remaining on the stimulable phosphor sheet before the stimulable phosphor sheet is readied for another recording cycle. If a power supply supply turn-off command signal is produced in error to turn off the power supply of the system, a control device energizes a breaker circuit to break the power supply circuit a predetermined period of time after the power supply turn-off command signal is produced. The control device determines optimum stop positions for the stimulable phosphor sheet to stop in based on the power supply turn-off command signal and a detected signal indicative of the present position of the stimulable phosphor sheet. Before the power supply circuit is actually broken, the circulatory feed system feeds the stimulable phosphor sheet to one of the determined optimum stop positions.

6 Claims, 3 Drawing Sheets

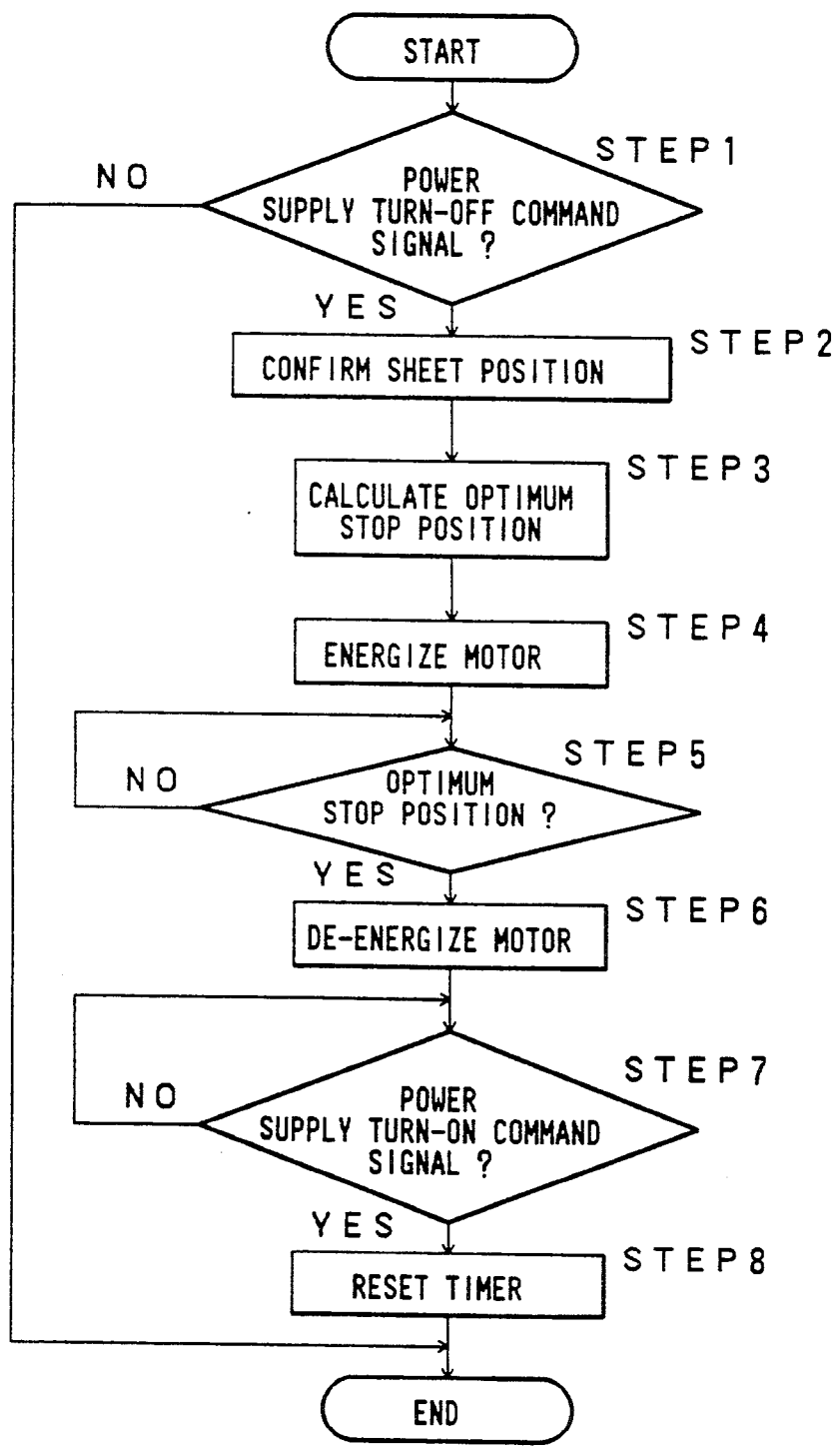

POWER SUPPLY CIRCUIT BREAKER FOR RADIATION IMAGE INFORMATION RECORDING AND READING SYSTEM

BACKGROUND OF THE INVENTION

1. Field of the Invention

The present invention relates to a radiographic system for repetitiously recording and reading radiation images on image recording mediums such as stimulable phosphor sheets while they are being circulated through an image recording device, an image reading device, and a remaining image erasing device by a feed system, and more particularly to a power supply circuit breaker for breaking the power supply circuit of the radiographic system in response to a power supply interrupting command after the stimulable phosphor sheets have been placed in an optimum condition.

2. Prior Art

There are known radiographic systems which record radiation image information in stimulable phosphor sheets. The stimulable phosphor sheet is a sheet having a layer of stimulable phosphor. The stimulable phosphor is a phosphorous material which, when exposed to radiation such as X-rays, α-rays, β-rays, γ-rays, cathode rays, or ultraviolet rays, stores a part of the energy of the radiation. When the phosphor exposed to the radiation is subsequently exposed to stimulating rays such as visible light, the phosphor emits light in proportion to the stored energy of the radiation.

In various proposed radiation image information recording and reading systems employing stimulable phosphor sheets, the radiation image information of an object such as a human body is recorded in a stimulable phosphor sheet, the stimulable phosphor sheet is then scanned with stimulating rays of light to emit light representing the recorded radiation image information, and then the emitted light is photoelectrically read to produce an image signal which is subsequently processed to produce a radiation image that can be used for suitable purpose such as medical diagnosis (see Japanese Laid-Open Patent Publication Nos. 55(1980)-12429, 56(1981)-11395, 55(1980)-163472, 56(1981)-104645, and 55(1980)-116340, for example). In such a system, a final image may be reproduced as a visible image on a hard copy or displayed as a visible image on a CRT. In the radiation image information recording and reading systems, the stimulable phosphor sheet does not serve as a final image information recording medium, but as an image storage medium for temporarily storing image information which is to be retrieved as a visible image on a final image information recording medium. Therefore, the stimulable phosphor sheet may be repetitiously used and, preferably, should be so used for economic reasons.

A radiation image information recording and reading system employing stimulable phosphor sheets may be mounted on a mobile station such as a mobile X-ray radiographic vehicle, and the mobile station may be sent to different places for taking X-ray images of the bodies of people in groups for diagnostic purpose. In such an application, it is not convenient to carry a number of stimulable phosphor sheets on the mobile station, and the number of stimulable phosphor sheets that can be carried on the mobile station is limited. Repetitious use of a limited number of stimulable phosphor sheets in a radiation image information recording and reading system on such a mobile station is therefore practically advantageous for taking X-ray body images of many people. Such X-ray images can be taken successively at a high speed through repetitious use of stimulable phosphor sheets.

In order to make a used stimulable phosphor sheet ready and available for recording radiation image information again, radiation energy remaining in the stimulable phosphor sheet after light representing previously recorded radiation image information has been emitted and read has to be discharged or erased upon exposure to erasing light rays, in the manner disclosed in Japanese Laid-Open Patent Publication Nos. 56(1981)-11392 and 56(1981)-12599.

The inventor of the present invention has proposed a built-in-type radiation image information recording and reading system which comprises a circulatory feed means for feeding a stimulable phosphor sheet, which can record a radiation image, along a circulatory path, an image recording device in the circulatory path for applying radiation which bears image information to the stimulable phosphor sheet to record radiation image information in the stimulable phosphor sheet, a stimulating light source in the circulatory path for emitting stimulating light rays to scan the stimulable phosphor sheet with the radiation image information recorded therein, an image reading device having a photoelectric transducer for reading light emitted from the stimulable phosphor sheet upon exposure to the stimulating light rays and producing an image signal from the read light, and a remaining image erasing device in the circulatory path for discharging radiation energy remaining on the stimulable phosphor sheet after the recorded radiation image information has been read in the image reading device and before another radiation image is recorded in the stimulable phosphor sheet in the image recording device, the devices being incorporated in a singe housing of the system. The stimulable phosphor sheet is circulated through the devices for repetitious use. The proposed radiation image information recording and reading system is disclosed in Japanese Laid-Open Patent Publication Nos. 59(1984)-192240 and 60(1985)-176032, for example.

Some radiation image information recording and reading systems of the type described above have curved circulatory paths for stimulable phosphor sheets in order to achieve a smaller system size or a desired outer profile.

If the power supply circuit of the radiation image information recording and reading system is broken or opened while a stimulable phosphor sheet is being fed along a curved portion of the circulatory path, then the stimulable phosphor sheet stops in the curved circulatory path portion. When this happens, the stimulable phosphor sheet held in the curved circulatory path portion tends to be damaged or deformed as it is subject to undue bending stresses from the curved circulatory path portion. Other stimulable phosphor sheets, which may happen to be present in the image recording and reading devices when the power supply is interrupted, are also liable to suffer problems since any processing on those stimulable phosphor sheets is interrupted undesirably.

SUMMARY OF THE INVENTION

It is a major object of the present invention to provide a power supply circuit breaker for a radiation image information recording and reading system, which power supply circuit breaker is capable of preventing stimulable phosphor sheets, which are being fed, from being damaged in any way, and of completing image recording and reading cycles without interruptions, when a power supply turn-off command signal is produced.

Another object of the present invention is to provide a power supply circuit breaker for a radiation image information recording and reading system, which power supply circuit breaker delays a power supply circuit breaking operation by a predetermined period of time when a power supply turn-off command signal is given, so that a stimulable phosphor sheet is allowed to reach an optimum stop position, rather than staying in a curved portion of a sheet feed system, and hence is prevented from being subject to undue stresses which would otherwise be caused by such a curved portion of the sheet feed system.

According to the present invention, there is provided a radiation image information recording and reading system comprising circulatory feed means for feeding a stimulable phosphor sheet, which can record a radiation image, along a circulatory path, an image recording device in the circulatory path for applying radiation which bears image information to the stimulable phosphor sheet to record radiation image information in the stimulable phosphor sheet, a stimulating light source in the circulatory path for emitting stimulating light rays to scan the stimulable phosphor sheet with the radiation image information recorded therein, an image reading device having a photoelectric transducer for reading light emitted from the stimulable phosphor sheet upon exposure to the stimulating light rays and producing an image signal from the read light, a remaining image erasing device in the circulatory path for discharging radiation energy remaining on the stimulable phosphor sheet after the recorded radiation image information has been read in the image reading device and before another radiation image is recorded in the stimulable phosphor sheet in the image recording device, power supply turn-off command means for producing a power supply turn-off command signal to turn off a power supply of the radiation image information recording and reading system, power supply circuit breaking means for breaking a power supply circuit of the power supply a predetermined period of time after the power supply turn-off command signal is produced by the power supply turn-off command means, sheet detecting means disposed in the circulatory path, for producing a detected signal when the stimulable phosphor sheet is detected, processing means for determining optimum stop positions for the stimulable phosphor sheet to stop in the circulatory path based on the power supply turnoff command signal and the detected signal, and actuating means for actuating the circulatory feed means to feed the stimulable phosphor sheet to one of the determined optimum stop positions.

The circulatory path has curved portions, the optimum stop positions including positions outside of the curved portions.

The power supply circuit breaking means comprises counting means for counting the predetermined period of time, the power supply turn-off command means comprising means for supplying the power supply turn-off command signal to the power supply circuit breaking means and for supplying a signal to interrupt the operation of the counting means to count the predetermined period of time.

The power supply circuit breaking means comprises holding means for holding, as the predetermined period of time, a maximum one of times required to feed the stimulable phosphor sheet to the optimum stop positions.

The sheet detecting means comprises a plurality of sensors disposed in the circulatory path.

The processing means comprises means for determining, as the optimum stop positions, positions where the sheet detecting means is located downstream of the stimulable phosphor sheet in the circulatory path.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a flowchart of an operation sequence of the power supply circuit breaker.

DETAILED DESCRIPTION OF THE PREFERRED EMBODIMENT

Figure 1:
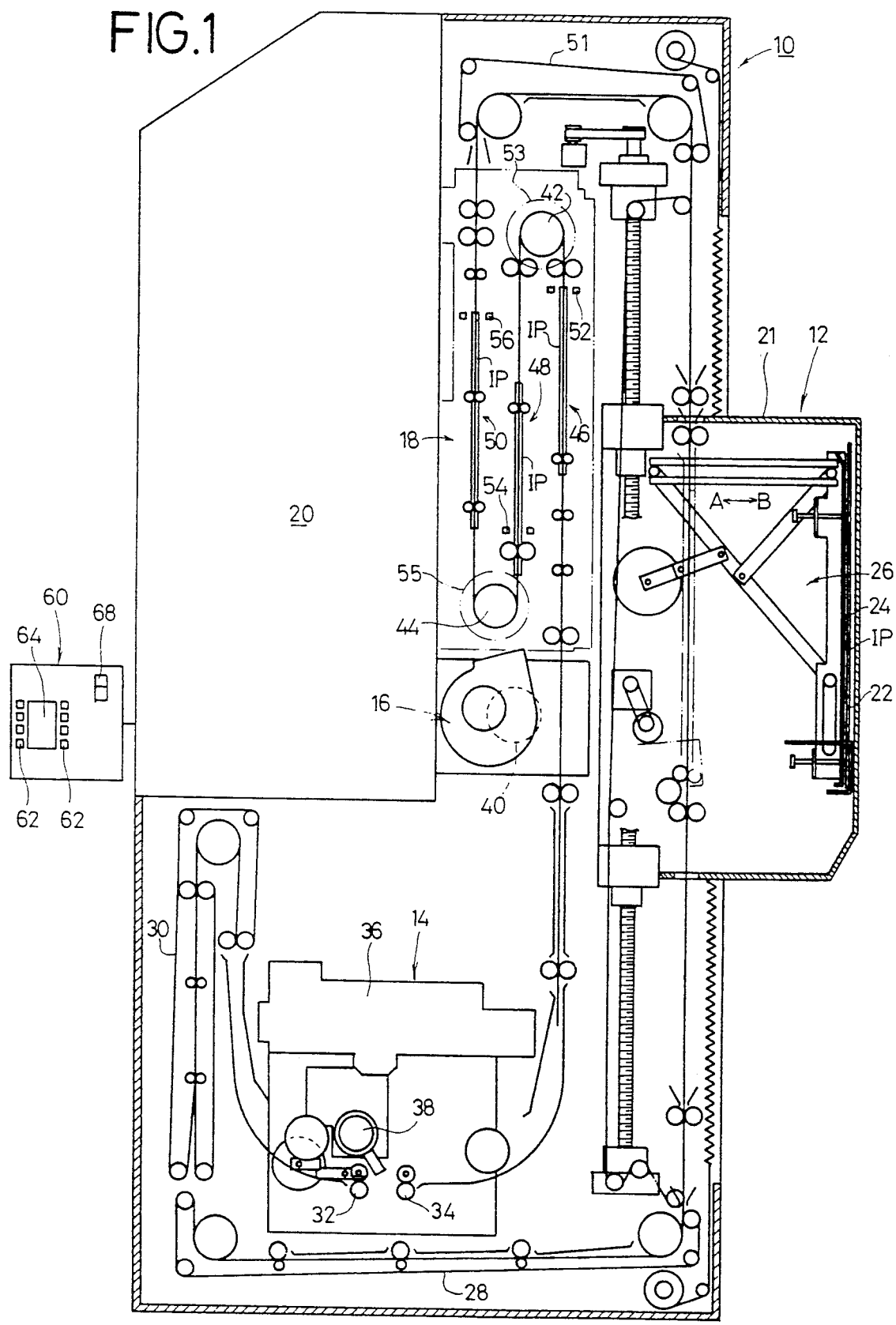
FIG. 1 is a schematic vertical cross-sectional view of a radiation image information recording and reading system which incorporates a power supply circuit breaker according to the present invention.

FIG. 1 shows a radiation image information recording and reading system 10 which incorporates a power supply circuit breaker according to the present invention. The radiation image information recording and reading system 10 generally comprises an image recording device 12, an image reading device 14, a remaining image erasing device 16, a pre-exposure stand-by device 18, and a control device 20. The image recording device 12, the image reading device 14, the remaining image erasing device 16, and the pre-exposure stand-by device 18 are interconnected by a feed system which feeds stimulable phosphor sheets IP.

The image recording device 12 includes an exposure unit 21 projecting forwardly of a front panel of the radiation image information recording and reading system 10, and movable vertically along the front panel. The exposure unit 21 has a link mechanism 26 disposed therein, the link mechanism 26 being displaceable in the directions indicated by the arrows A, B while sandwiching a stimulable phosphor sheet IP between front and rear plates 22, 24. A shutter mechanism is mounted on lower ends of the front and rear plates 22, 24, for releasing a stimulable phosphor sheet IP when the link mechanism 26 has been displaced in the direction indicated by the arrow A, and for holding a stimulable phosphor sheet IP when the link mechanism 26 is to be displaced in the direction indicated by the arrow B.

The image reading device 14 is connected to the image recording device 12 by feed system assemblies 28, 30. The image reading device 14 includes two pairs of nip rollers 32, 34 for gripping a stimulable phosphor sheet IP supplied from the feed system assembly 30, an optical unit 36 for applying a scanning laser beam to the stimulable phosphor sheet IP between the nip rollers 32, 34, and a light guide unit 38 including a photoelectric transducer for reading light, which is representative of the radiation image information recorded in the stimulable phosphor sheet IP, emitted from the stimulaphosphor sheet IP upon exposure to the scanning laser beam.

The remaining image erasing device 16 is disposed downstream, or upwardly, of the image reading device 14. The pre-exposure stand-by device 18 comprises a feed system assembly having a feed path which is bent by rollers 42, 44. The feed system assembly of the pre-exposure stand-by device 18 includes a first stand-by zone 46, a second stand-by zone 48, and a third stand-by zone 50. The pre-exposure stand-by device 18 is connected to the image recording device 12 through a feed system assembly 51. The rollers 42, 44 are coupled respectively to motors 53, 55 of the feed system assembly of the pre-exposure stand-by device 18. The motor 3 rotates the roller 42 to transfer a stimulable phosphor sheet IP from the first stand-by zone 46 to the second stand-by zone 48, and the motor 55 rotates the roller 44 to transfer a stimulable phosphor sheet IP from the second and-by zone 48 to the third stand-by zone 50. The first, second, and third stand-by zones 46, 48, 50 have respective sensors or sheet detecting means 52, 54, 56 each for detecting a stimulable phosphor sheet IP and producing a detected signal.

The control device 20 serves to control operation the radiation image information recording and reading system 10, and is connected to a control console 60 disposed outside of the housing of the system 10. The control console 60 comprises an input unit 62 for setting conditions for operating the radiation image information recording and reading system 10, a display unit 64, and a power supply switch 6 for turning on and off the power supply of the radiation image information recording and reading system 10. The power supply switch 68 also serves as power supply turn-off command means for producing a signal indicative of a power supply turn-off command.

Figure 2:
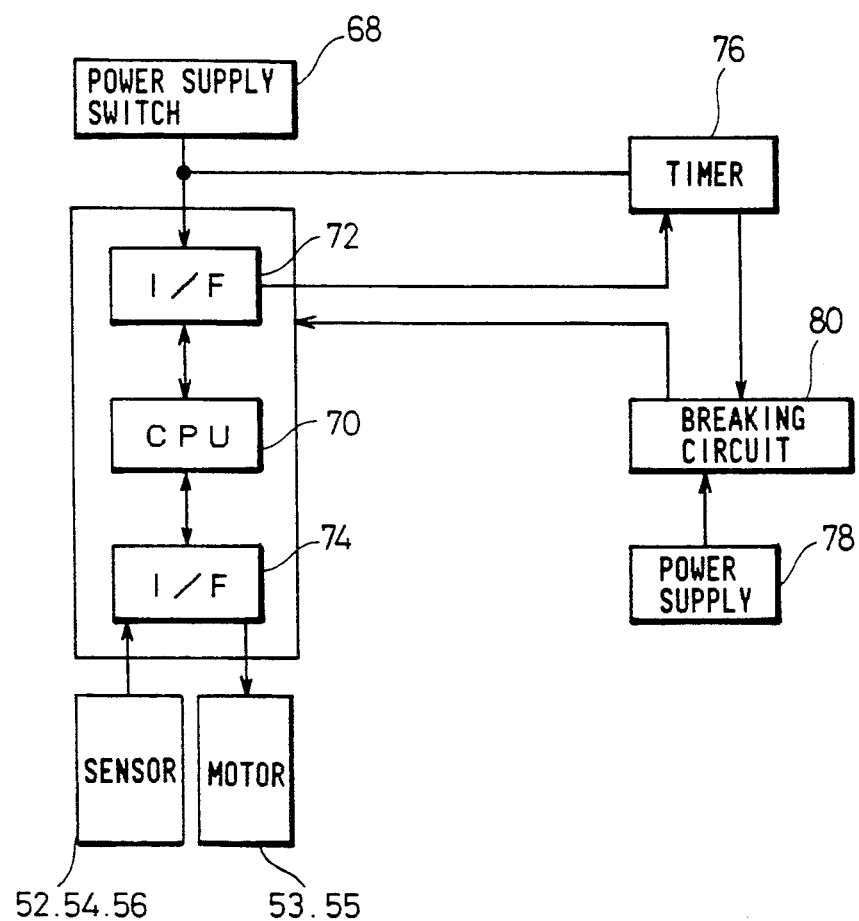
FIG. 2 is a block diagram of the power supply circuit breaker according to the present invention.

The power supply circuit breaker in the radiation image information recording and reading system 10 has a circuit arrangement shown in FIG. 2 which is part of the control circuit of the control device 20. As shown in FIG. 2, the control device 20 includes an interface 72, a CPU 70 as a processing means, and an interface 74. The power supply switch 68 is connected to the CPU 70 through the interface 72. The sensors 52, 54, 56 and the motors 53, 55 are connected to the CPU 70 through the interface 74. The power supply circuit breaker, which serves as a power supply circuit breaking means, comprises a timer 76 which starts to count time when a power supply turn-off command signal is applied from the power supply switch 68, and a breaker circuit 80 for breaking a power supply circuit of a power supply 78 for the radiation image information recording and reading system 10 in response to a power supply turn-off signal from the timer 76. The timer 76 is connected to the power supply switch 68, and the breaker circuit 80 is connected to the timer 76. The timer 76 is also connected to the interface 72, so that a timer resetting signal is transmitted from the CPU 70 through the interface 72 to the timer 76.

The radiation image information recording and reading system 10 is basically constructed as above. Operation and advantages of the radiation image information recording and reading system will now be described below.

The radiation image information recording and reading system 10 is loaded with a total of four stimulable phosphor sheets IP, which are placed respectively in an exposure position in the image recording device 12, the first stand-by zone 46, the second stand-by zone 48, and the third stand-by zone 50 of the pre-exposure stand-by device After an object is placed in front of the exposure unit 21 of the image recording device 12, X-rays are applied from an X-ray source to the object. The X-rays are transmitted through the object into the image recording device 12, thus recording a transmitted-radiation image in the stimulable phosphor sheet IP in the exposure position.

The stimulable phosphor sheet IP with the image recorded therein is displaced in the direction indicated by the arrow A by the link mechanism 26, and is thereafter fed to the image reading device 14 through the feed system assemblies 28, 30.

In the image reading device 14, the stimulable phosphor sheet IP is gripped and transferred by the nip rollers 32, 34 while at the same time a laser beam is applied to the stimulable phosphor sheet IP by the optical unit 36. Light, representative of the radiation image information stored in the stimulable phosphor sheet IP, is then emitted from the stimulable phosphor sheet IP and guided by the light guide unit 38. The light is then converted into an electric signal by a photoelectric transducer connected to the light guide unit 38.

The stimulable phosphor sheet IP from which the radiation image information has been read is thereafter fed into the remaining image erasing device 16, in which remaining radiation energy is discharged from the stimulable phosphor sheet IP by the erasing light source 40.

After the remaining radiation energy is erased, the stimulable phosphor sheet IP is delivered into the first stand-by zone 46 of the pre-exposure stand-by zone 18, so that the stimulable phosphor sheet IP is readied for a next exposure cycle. The stimulable phosphor sheets IP which have been placed respectively in the first, second, and third stand-by zones 46, 48, 50 are successively fed into the image recording device 12 for respective exposure cycles. In the image recording device 12, the transferred stimulable phosphor sheet IP is sandwiched between the front and rear plates 22, 24, and the link mechanism 26 is displaced in the direction indicated by the arrow B until the sandwiched stimulable phosphor sheet IP is brought into the exposure position.

While the radiation image information recording and reading system 10 is in operation, the power supply switch 68 may be inadvertently triggered to break the power supply circuit by the operator of the system 10. If the power supply 78 were turned off immediately in response to such a command form the power supply switch 68, then the stimulable phosphor sheets IP which are being processed may be damaged or otherwise suffer trouble. To avoid such a problem, the power supply circuit breaker according to the present invention is incorporated in the radiation image information recording and reading system 10. Operation of the power supply circuit breaker will be described below with reference to the flowchart of FIG. 3.

When the power supply switch 68 is triggered to breaker the power supply circuit by the operator, the power supply circuit 68 supplies a power supply turn-off command signal to the CPU 70 through the interface 72 in a step S1. The power supply turn-off command signal is also applied to the timer 76, which starts counting time.

In response to the power supply turn-off command signal, the CPU 70 confirms the present positions of the stimulable phosphor sheets IP based on detected signals from the sensors 52, 54, 56 in a step S2. Then, the CPU 70 calculates optimum stop positions for the stimulable phosphor sheets IP to stop in based on the detected signals in a step S3.

For example, if a detected signal is transmitted from the sensor 52, a stimulable phosphor sheet IP may have a portion present in a curved feed path around the roller 42. When this happens, the CPU 70 recognizes, as an optimum stop position, a position where that stimulable phosphor sheet IP is transferred and detected by the sensor 54, in the step S3. Then, the CPU 70 continuously energizes the motor 53 in a step S4 until the sensor 54 detects the stimulable phosphor sheet IP in a step S5, and then de-energizes the motor 53 in a step S6.

The time 76 continuously counts time after the power supply turn-off command signal has been applied from the power supply switch 68. After elapse of a predetermined period of time, the timer 76 energizes the breaker circuit 80 to break the power supply circuit of the power supply circuit 78. If the predetermined period of time which is counted by the timer 76 is selected to be longer than the time required to feed the stimulable phosphor sheets IP to their optimum stop positions, then the stimulable phosphor sheets IP are prevented from staying in undesirable positions in the radiation image information recording and reading system 10, e.g., in curved feed paths in the pre-exposure stand-by device 18, but are stopped and maintained in optimum conditions.

If the power supply switch 68 is operated on to make the power supply circuit by the operator before the predetermined period of time counted by the timer 76 elapses, then a power supply turn-on command signal is supplied from the power supply switch 68 through the interface 72 to the CPU 70 in a step S7. Then, the CPU 70 applies a resetting signal through the interface 72 to the timer 76, which then interrupts the counting of time by the timer 76 in a step S8. Therefore, the radiation image information recording and reading system 10 continuously processes the stimulable phosphor sheets IP.

In the above embodiment, difficulties which might be caused to the stimulable phosphor sheets IP in the pre-exposure stand-by device 18 in the event of unwanted power supply interruptions can be avoided by the power supply circuit breaker according to the present invention. However, sheet detecting means may be disposed in the other devices. of the radiation image information recording and reading system 10 and connected to the circuit arrangement shown in FIG. 2 so that stimulable phosphor sheets IP which happen to be present in those devices in the event of undesirable power supply interruptions can be prevented from being damaged or otherwise improperly processed. For example, the time counted by the timer 76 may be selected such that if a stimulable phosphor sheet IP is detected by a detecting means in the image recording device 12, the power supply circuit of the power supply 78 will not be broken until the time required to expose the stimulable phosphor sheet IP in the image recording device 12 to X-rays transmitted through the object. Likewise, the time counted by the timer 76 may be selected such that if a stimulable phosphor sheet IP is detected by a detecting means in the image reading device 12, the power supply circuit of the power supply 78 will not be broken until the time required to read the recorded radiation image form the stimulable phosphor sheet IP in the image reading device 12, and if a stimulable phosphor sheet IP is detected by a detecting means in the remaining image erasing device 16, the power supply circuit of the power supply 78 will not be broken until the timer required to erase remaining radiation energy from the stimulable phosphor sheet IP in the remaining image erasing device 16. If the timer 76 is set to a time which is equal to the maximum one of times required to perform processes which would cause trouble if interrupted undesirably, then all difficulties caused by inadvertent triggering of the power supply switch 68 can be avoided.

With the present invention, as described above, the power supply is actually turned off a predetermined period of time after a power supply turn-off command signal is applied, and stimulable phosphor sheets are continuously processed or fed to optimum stop positions before the power supply is actually turned off. Therefore, even if a power supply turn-off command signal is produced to turn off the power supply through an oversight of the operator, the stimulable phosphor sheets in the radiation image information recording and reading system can be maintained in good conditions since they are transferred to optimum stop positions before the power supply is actually turned off.

Although a certain preferred embodiment has been shown and described, it should be understood that many changes and modifications may be made therein without departing from the scope of the appended claims.

What is claimed is:

1. A radiation image information recording and reading system comprising:
   circulatory feed means for feeding a stimulable phosphor sheet, which can record a radiation image, along a circulatory path;
   an image recording device in said circulatory path for applying radiation which bears image information to the stimulable phosphor sheet to record radiation image information in the stimulable phosphor sheet;
   a stimulating light source in said circulatory path for emitting stimulating light rays to scan the stimulable phosphor sheet with the radiation image information recorded therein;
   an image reading device having a photoelectric transducer for reading light emitted from the stimulable phosphor sheet upon exposure to the stimulating light rays and producing an image signal from the light emitted from the stimulable phosphor sheet;
   a remaining image erasing device in said circulatory path for discharging radiation energy remaining on the stimulable phosphor sheet after the recorded radiation image information has been reading said image reading device and before another radiation image is recorded in the stimulable phosphor sheet in said image recording device;
   power supply turn-off command means for producing a power supply turn-off command signal to turn off a power supply of the radiation image information recording and reading system;
   power supply circuit breaking means for breaking a power supply circuit of the power supply a predetermined period of time after the power supply turn-off command signal is produced by said power supply turn-off command means;

sheet detecting means disposed in said circulatory path, for producing a detected signal when the stimulable phosphor sheet is detected;

processing means for determining optimum stop positions for the stimulable phosphor sheet to stop in along the circulatory path based on said power supply turn-off command signal and said detected signal; and actuating means for actuating said circulatory feed means to feed the stimulable phosphor sheet to one of said determined optimum stop positions.

2. A radiation image information recording and reading system according to claim 1, wherein said circulatory path has curved portions, said optimum stop positions including positions outside of said curved portions.

3. A radiation image information recording and reading system according to claim 1, wherein said power supply circuit breaking means comprises counting means for counting said predetermined period of time, said power supply turn-off command means comprising means for supplying the power supply turn-off command signal to said power supply circuit breaking means and for supplying a signal to interrupt the operation of said counting means to count said predetermined period of time.

4. A radiation image information recording and reading system according to claim 1, wherein said power supply circuit breaking means comprises holding means for holding, as said predetermined period of time, a maximum one of times required to feed the stimulable phosphor sheet to one of said optimum stop positions.

5. A radiation image information recording and reading system according to claim 1, wherein said sheet detecting means comprises a plurality of sensors disposed in said circulatory path.

6. A radiation image information recording and reading system according to claim 1, wherein said processing means comprises means for determining, a said optimum stop position, a position where said sheet detecting means is located downstream of the stimulable phosphor sheet along said circulatory path.

* * * * *